United States Patent
Apfelbach et al.

[11] 3,802,907
[45] Apr. 9, 1974

[54] METALLIZING PROCESS

[75] Inventors: Roland Apfelbach; Ayiller Josef Jostan, both of Ulm-Bofingen, Germany

[73] Assignee: Licentia Patent-Verwaltungs GmbH, Frankfurt, Germany

[22] Filed: Jan. 29, 1971

[21] Appl. No.: 110,883

[30] Foreign Application Priority Data
Jan. 30, 1970 Germany............................ 2004133

[52] U.S. Cl.................. 117/54, 117/70 S, 117/71 R
[51] Int. Cl............................................. C23c 3/02
[58] Field of Search ...... 117/70 S, 54, 169 A, 71 R, 117/135.1, 123 B, 124 C

[56] References Cited
UNITED STATES PATENTS
1,282,259  10/1918  Merritt............................ 117/71 X
3,472,742  10/1969  Webb............................ 117/135.1 X
3,093,501  6/1963   Clayton ........................ 117/70 S X
2,717,840  9/1955   Bosch .............................. 117/70 S
2,978,361  4/1961   Seidl............................ 117/70 S X
3,672,939  6/1972   Miller .............................. 117/35 S
3,406,036  10/1968  McGrath et al. .................. 117/54 X Primary Examiner—Ralph S. Kendall
Attorney, Agent, or Firm—Spencer & Kaye

[57] ABSTRACT

Silicic acid and electrolessly deposited metal are deposited on a glass or ceramic body in any order, even simultaneously. Then the body is heat treated to increase the adherence of the silicic acid and metal to the body. Additional metal can then be galvanically deposited onto the electrolessly deposited metal. The metal adherence is greatly improved over that obtained by previous techniques for metallizing glass or ceramic bodies.

18 Claims, 2 Drawing Figures

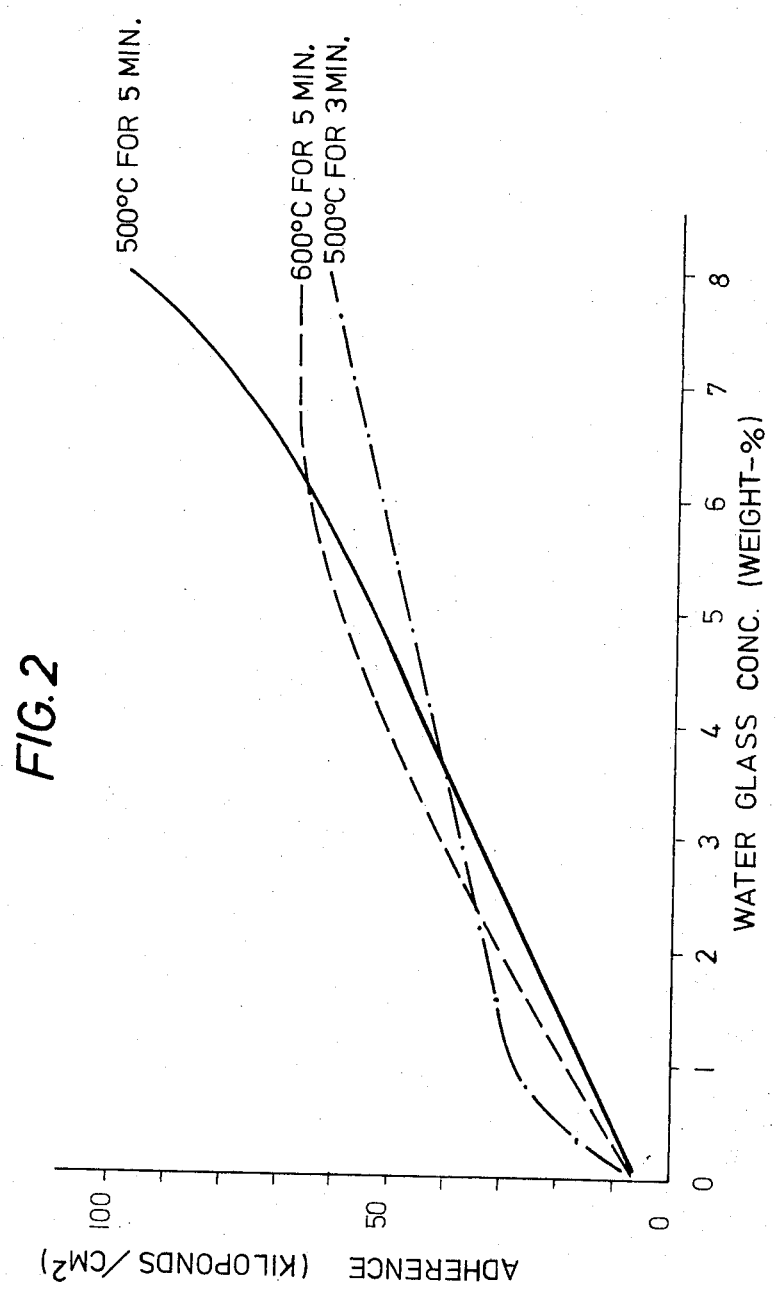

METALLIZING PROCESS

BACKGROUND OF THE INVENTION

The present invention relates to a process for metallizing glass or ceramic bodies using electroless metal-deposition in a metallizing bath.

Ceramic materials, such as aluminum oxide, beryllium oxide, ferrites, as well as quartz and various glasses, are used in a multitude of electrical and electronic applications as insulators, dielectrics, and as supports. As used herein, the term glass refers to oxide materials which are predominantly amorphous in structure, while the term ceramic refers to oxide materials which are predominately crystalline in structure. As is well known, there are glasses which have the same chemical formula as ceramics, the only distinction being an amorphous as opposed to a crystalline structure. The crystalline particles of many ceramics are bonded together by a glassy phase.

To produce thin and thick film circuits, it is usual to use high-purity aluminum oxide, quartz, or borosilicate glass plates as substrates. These materials are coated in high vacuum by the evaporation of chromium, copper, gold, and other metals. The desired conductor structures are then produced with the help of photoetching techniques. Chemical and galvanic methods for metallizing glass or ceramic materials are known; examples are electroless coppering with formaldehyde or hydrazine as reducing agent or electroless nickeling with hypophosphite or boranate as reducing agent.

The above-described known processes can be used successfully for metallizing when the metal is in the form of a very thin film, but they fail when thicker films are to be deposited. Especially troublesome are situations where the thicker films are galvanically increased in thickness, where they are soldered or brazed, and where they are subjected to high mechanical loading.

The cause for the failure of these processes in the case of thicker films is the low adherence of the films to the non-metallic bodies to which they have been applied. The problem is especially severe with surfaces of low roughness.

SUMMARY OF THE INVENTION

An object of the present invention, therefore, is to provide a process enabling the electroless deposition of metal films on glass or ceramic bodies with such adherence between metal and body, that the metal films can be directly galvanically increased in thickness, soldered or brazed, or mechanically loaded without danger of failure by, for instance, a separating of the metal film from the body.

This as well as other objects which will become apparent in the discussion that follows are achieved, according to the present invention, by depositing an adherence-producing layer of silicic acid on the glass or ceramic body before and/or during and/or after a electroless metal deposition on the body. After both the silicic acid and electrolessly deposited metal are on the body, the body is heat treated for increasing adherence of the deposited materials to the body.

BRIEF DESCRIPTION OF THE DRAWING

FIG. 2 is a graph of adherence versus water glass concentration.

DESCRIPTION OF THE PREFERRED EMBODIMENTS

Figure 1:
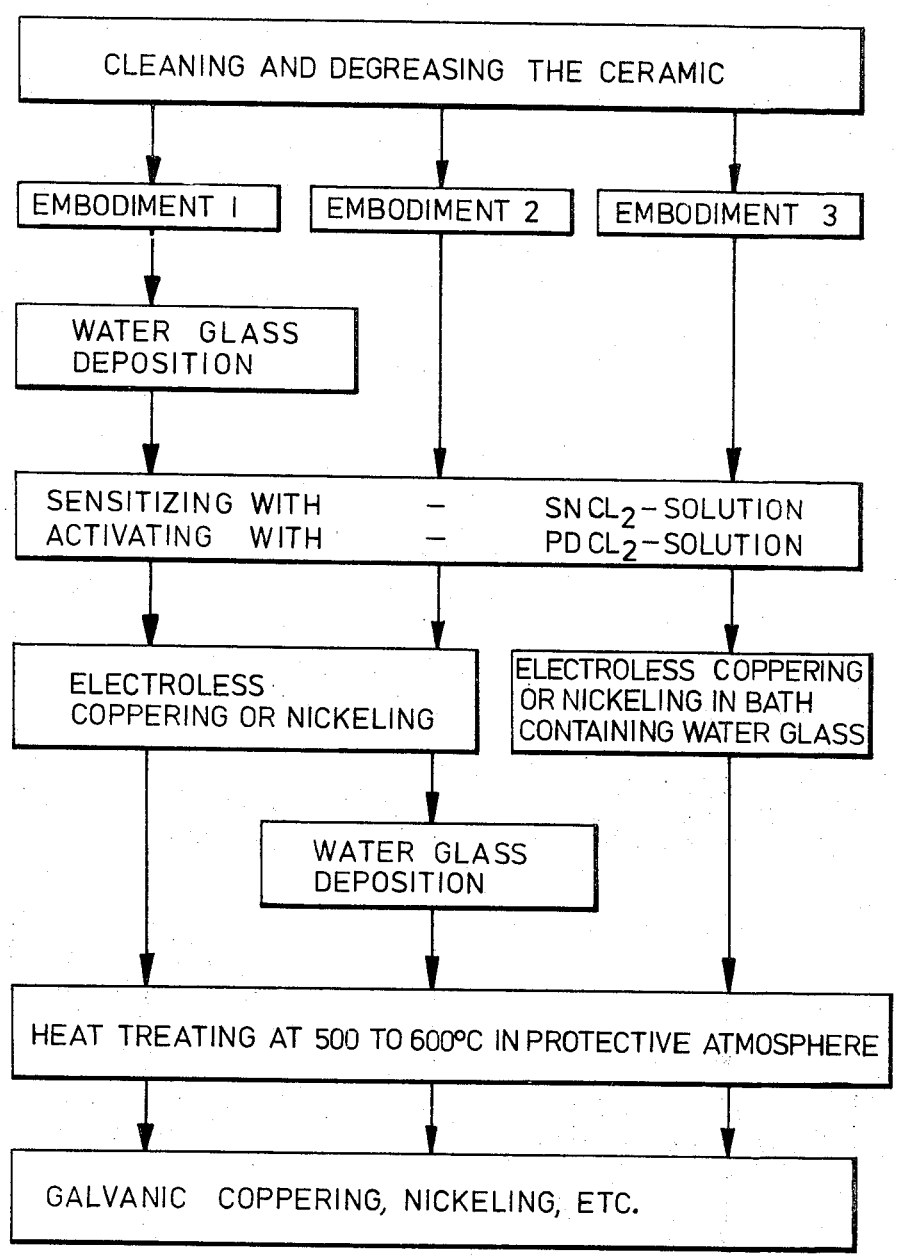
FIG. 1 is a flow chart of the process of the invention, illustrating three embodiments.

The deposition of the silicic acid can proceed before, and/or during, and/or after the electroless metal deposition. For example, the metallized or nonmetallized body can be immersed in a dilute water glass solution, or silicic acid and/or soluble silicate, preferably alkali silicate, especially water glass, can be added to a electroless copper or nickel bath, or a water glass solution can be sprayed onto the ceramic body at the same time that it is being sprayed with copper. Immediately and/or after a subsequent watering the alkali silicate contained in the water glass solution hydrolyzes to a silicic acid gel, which contains large amounts of absorbed water and which is adsorbed onto the surface of the glass or ceramic body. The hydrolyzing of the alkali silicate can be accelerated by watering or by rinsing with slightly acidic water.

In the case of a subsequent immersing of an already thinly metallized ceramic substrate in a water glass solution, the silicic acid gel arises on the metal film, but it bonds with the ceramic through pores in the metal film during the heat treating step of the invention. In this way, the metal film is anchored to the ceramic substrate. It is important in this variant of the invention that the metal film still have pores in it through which the ceramic substrate is accessible. The thinner the metal film, the more the ceramic substance is accessible by way of pores.

Further illustrative of the invention are the following Examples:

EXAMPLE I

A 0.6 to 0.7 millimeters thick plate of high-purity aluminum oxide ceramic (99.5 weight % $Al_2O_3$) is to be provided on both sides with 10 $\mu$m thick copper layers for the production of microwave circuits. The layers must be easily solderable and adherent.

The roughness of the aluminum oxide surfaces is around $2 \times 10^{-6}$ meters.

Proceeding according to Embodiment 1 of FIG. 1, the $Al_2O_3$ plate is first cleaned and degreased in chromosulfuric acid and rinsed in deionized water. It is then immersed in a 20 to 25 weight percent sodium water glass solution and subsequently pulled out, with the plane of its faces vertical, at a speed of 0.2 to 0.5 millimeters per second. The plate is then dried at a maximum temperature of 35°C for about 30 minutes. The plate is next rinsed in water, in order to start the hydrolyzing of the sodium silicate. In order to perform the electroless deposition of metal, the plate is next sensitized by immersing it for 5 minutes in a room-temperature, aqueous sensitizing solution of the following composition: $SnCl_2 \cdot 2H_2O$ at 10 to 40 grams per liter and concentrated HCl at 40 milliliters per liter. This is followed by activating by immersing the plate for 5 minutes in a room-temperature, aqueous activating solution of composition: $PdCl_2$ at 0.3 grams per liter and concentrated HCl at 3 milliliters per liter. After further rinsing, the plate is immersed in an aqueous solution of composition as follows for a currentless nickeling:

Nickel chloride ($NiCl_2 \cdot 6H_2O$) — 30 g/l
Sodium citrate ($C_6H_5O_7Na_3 \cdot 2H_2O$) — 100 g/l
Ammonium chloride ($NH_4Cl$) — 50 g/l Sodium hypophosphite (NaH$_2$PO$_2$·H$_2$O) — 10 g/l
pH — 8 to 10
Temperature — 88° to 90°C,
where g equals grams and l equals liters. A metal film thickness of 0.5 – 0.8 μm is obtained when the plate is removed after 3 minutes of immersion. The plate is then heat treated by placing it in a furnace for 4.5 to 6 minutes at 500° to 600°C under a protective, nitrogen atmosphere.

Upon cooling, the plate can be galvanically plated with copper in an acidic copper bath, in order to build up the desired 10 μm layer. The adherence of such a 10 μm layer amounts to 110 kiloponds per square centimeter. The advantage of the present invention is clearly brought out by the fact that a 10 μm nickel or copper layer which is applied without the water glass treatment of the present invention has an adherence of only about 3 kiloponds/cm$^2$. The exact electroless deposition and plating conditions of the process which yielded the 110 kilopond adherence for the 10 μm layer of copper are, as follows: After cleaning and degreasing the Al$_2$O$_3$ plate in the above presented mixture of chromic and sulfuric acid for five minutes at the temperature of 55° C and after rinsing the plate with deionized water for 5 minutes, it is then immersed in a 25 weight percent sodium water glass solution and subsequently pulled out, with the plane of its faces vertical, at a speed of 0.5 millimeters per second. The plate is then dried at a temperature of 35° C for 30 minutes. The plate is next rinsed in water, in order to start the hydrolyzing of the sodium silicate. In order to perform the electroless deposition of metal, the plate is next sensitized by immersing it for 5 minutes in a room-temperature, aqueous sensitizing solution of the following composition: SnCl$_2$·2H$_2$O at 20 grams per liter and concentrated HCl at 40 milliliters per liter. This is followed by activating by immersing the plate for 5 minutes in a room-temperature, aqueous activating solution of composition: PdCl$_2$ at 0.3 grams per liter and concentrated HCl at 3 milliliters per liter. After further rinsing, the plate is immersed in an aqueous solution of composition as follows for a electroless nickeling:

Nickel chloride (NiCl$_2$ · 6H$_2$O) — 30 g/l
Sodium citrate (C$_6$H$_5$O$_7$Na$_3$ · 2H$_2$O) — 100 g/l
Ammonium chloride (NH$_4$Cl) — 50 g/l
Sodium hypophosphite (NaH$_2$PO$_2$ · H$_2$O) — 10 g/l
pH — 10
Temperature — 90° C, where g equals grams and l equals liters. A metal film thickness of 0.5 μm is obtained when the plate is removed after 3 minutes of immersion. The plate is then heat treated by placing it in a furnace for 6 minutes at 600° C under a protective, nitrogen atmosphere.

Upon cooling, the plate is galvanically plated with copper in the acidic copper bath of the following composition and at the following conditions:

Copper sulfate (CuSO$_4$ · 5H$_2$O) — 220 g/l
Sulfuric acid (H$_2$SO$_4$, concentrated) — 55 g/l
Thiourea — 0.01 g/l
Molasses — 0.8 g/l
Triton 720 — 0.2 g/l
$P_H$ — 1.0
Temperature — 20° C
Current density — 2.8 amp/dm$^2$
Plating time for the 10 μm copper layer — 20 min

EXAMPLE II

The ceramic plate as described in Example I is electrolessly coppered according to Embodiment 2 of FIG. 1. The composition of the copper bath for the electroless deposition is as follows:

Copper sulfate (CuSO$_4$·5H$_2$O) — 28 g
Potassium sodium tartrate (KNaC$_4$H$_4$O$_6$·4H$_2$O) — 78 g
Sodium carbonate (Na$_2$CO$_3$) — 32 g
Sodium hydroxide (NaOH) — 20 g
Formaldehyde (HCHO in 35 weight-percent aqueous solution) — 25 ml
Water — 2,000 ml, where g equals grams and ml equals milliliters. The electroless deposition is carried out at room temperature and is with a speed of 0.3 to 0.5, preferably of 0.4 μm deposition thickness per minute. The plate is allowed to remain in the solution long enough to achieve a copper film of 0.3 to 0.6, preferably of 0.6 μm thickness and is then immersed in an 8 weight percent water glass solution. The plate is then pulled out of this solution in the manner described in Example I with a speed of 0.2 to 0.5, preferably of 0.5 millimeters per second. The heat treatment and galvanic coppering are carried out as described for Example I.

The adherence of the 10 μm thick copper film to the Al$_2$O$_3$ plate depends in this embodiment on the heat treating temperature and time and on the concentration of the water glass solution. This dependence is illustrated in FIG. 2 for three different combinations of heat treating time and temperature. With increasing concentration of the sodium silicate solution, the adherence of the copper film also increases. At a concentration of greater than 8 weight-percent sodium silicate in solution, the silicic acid layer arising on the electrolessly deposited copper film is so thick and dense that the electrolessly deposited film can no longer be built up by galvanic deposition of copper. The silicic acid layer acts as an insulator on the electrolessly deposited metal film. On the other hand, the electrolessly deposited copper film is quite amenable to build up when sodium silicate concentrations below 8 weight-percent are used and the adherence of the built-up film lies significantly above that of films deposited without the water glass treatment of the present invention.

EXAMPLE III

According to Embodiment 3 of FIG. 1, water glass is added to a electrolessly operating copper or nickel deposition bath in a concentration of 0.5 to 2.0 preferably of 1.5 weight percent. Addition of this amount of water glass causes the working temperature of the copper electroless deposition bath of Example II to rise to 60°C. To improve the stability of the bath, it must be continuously filtered. Bath temperatures above 80°C cause a precipitation of silicic acid gel, so the above-described copper bath for electroless deposition must be used at temperatures between 60° and 80°C. Additionally, a more intensive activating is advisable in Embodiment 3. This can be done by repeated sensitizing and activating or by a short preliminary electroless copper deposition before carrying out the actual electroless deposition in the presence of water glass. The remaining process steps are as described for Example I.

EXAMPLE IV

One proceeds as in Example I, except that the water glass solution has a 20 weight percent concentration and a temperature of 20° C, the plate is removed at a speed of 0.3 millimeters per second into a room having a temperature of 20° C and a relative humidity of 40 percent, the concentration of the $SnCl_2·2H_2O$ is 20 grams per liter, the pH of the sensitizing solution is 1.0, the pH of the activating solution is 1.0, and the heat treating is for 5 minutes at 600° C.

One proceeds as in Example II, except that the plate is left in the copper electroless deposition bath for 30 minutes, the water glass solution has a temperature of 20° C, and the plate is withdrawn at a speed of 0.3 millimeters per second into a room having a temperature of 20° C and a relative humidity of 40 percent.

EXAMPLE VI

One proceeds as in Example III, except that the water glass is added at a concentration of 2.5 weight percent, the electroless deposition bath is kept at a temperature of 70° C, and a more intensive activating is achieved as follows:

Immersing the plate in the sensitizing solution described in Example I and activating by immersing the plate for 5 minutes in the activating solution described in Example I, but at a temperature of 35° C.

The preferred more intensive activating method is, however, the following: Immersing the plate for 20 minutes at room temperature in the commercial activating solution "Catalyst 6F" (Shipley Co.) followed by immersing the plate for 20 minutes at room temperature in the commercial solution "Accelerator 19" (Shipley Co.).

Symbols and terms used herein are defined as follows:

a. The Greek letter $\mu$ equals $10^{-6}$.
b. The letter m stands for meters.
c. The pond is the unit of force; the weight of a mass of 1 gram on earth (sea level) is 1 pond.
d. The term water glass refers to a water soluble compound of $SiO_2$ and $Na_2O$. The particular water glass used in the above examples has a mol ratio $SiO_2/Na_2O$ equals 3.2/1.
e. Galvanic in regard to metal deposition indicates a process wherein the ceramic body with the electrolessly deposited metal of the above examples is placed in a solution of ions of the metal to be deposited and an external voltage is placed on the electrolessly deposited metal to cause electrons to flow from the electrolessly deposited metal into the solution, whereby the metal to be deposited is plated onto the electrolessly deposited metal. Electroless deposition of metal indicates a process of metal deposition which is not galvanic; electroless metal deposition includes the above processes of the examples where the metal to be deposited is produced from metal ions by the action of a reducing agent like hypophosphite or formaldehyde; it also includes the spraying of zero-valent metal onto the surface to be coated.
f. For measuring adherence one produces by a photoetching technique 20 statistically distributed test points in the metal film plated on the ceramic, each of these test points having an area of 25 mm². Such a test point is then soldered to a copper rod connected with a tensile testing apparatus. The measured separating power of the metal film from the ceramic substrate, relative to the surface exposed by the separation, will give the scale for adherence in kp/cm². (kiloponds per square centimeters). An analogous testing method is described by N. F. Murphy and E. F. Swansey: "The Application of a Direct Tensile Joint Strength Test to Electroless Plated Plastic" in Plating, April 1969, p. 371 – 376.

g. The surface roughness of the substrate was measured by the stylus method with reference to DIN 4768.
h. Chromosulfuric acid is a mixture of 23 grams of $Na_2Cr_2O_7·2H_2O$, 10 milliliters of water and 300 milliliters of concentrated sulfuric acid.
i. Instead of sodium water glass it is possible to use potassium water glass, a water soluble compound of $SiO_2$ and $K_2O$, with the same mol ratio as described herein above under point d. In this case the concentration of the water glass described in the Examples I to VI must be corrected with respect to the different molecular weight in order to get the same concentration of $SiO_2$.

It will be understood that the above description of the present invention is susceptible to various modifications, changes and adaptations, and the same are intended to be comprehended within the meaning and range of equivalents of the appended claims.

We claim:

1. A process for metallizing a glass or ceramic body comprising the steps of electrolessly depositing, as one material, a thin film of metal on said body, depositing, as another material, silicic acid on said body, and heat treating the body at 500°–600°C in the protective atmosphere for increasing the adherence of the deposited materials to the body whereby the electrolessly deposited metal film is amenable to build-up by galvanic deposition of metal.

2. A process as claimed in claim 1, wherein the step of depositing silicic acid includes contacting said body with an aqueous solution of alkali silicate.

3. A process as claimed in claim 1, wherein a substance selected from the group consisting of silicic acid and soluble silicates is added to a electroless metallizing bath, whereby both steps of depositing are carried out simultaneously.

4. A process as claimed in claim 3, wherein said substance is selected from the group consisting of the alkali silicates.

5. A process as claimed in claim 4, wherein said substance is water glass.

6. A process as claimed in claim 1, wherein the step of depositing silicic acid is carried out before the step of depositing metal.

7. A process as claimed in claim 6, wherein said body is $Al_2O_3$; wherein the step of depositing silicic acid comprises the steps of cleaning the body in chromosulfuric acid, then immersing the body in a 20 to 25 weight percent sodium water glass solution, then pulling the body out of the water glass solution with a speed of 0.2 to 0.5 millimeters per second, then drying the body at a maximum temperature of 35°C for about 30 minutes, and then rinsing the body in water; wherein the step of depositing metal comprises the steps of sensitizing the body in a solution containing 10 to 40 grams per liter $SnCl_2·2H_2O$ and about 40 milliliters per liter concentrated HCl, then activating the body in a solution containing about 0.3 grams per liter $PdCl_2$ and about 3 milliliters per liter concentrated HCl, and then immersing the body in a electroless metallizing bath for providing a metal film of thickness 0.5 to 0.8 μm; and wherein the step of heat treating comprises holding the body at 500° to 600°C for 4.5 to 6 minutes under a protective atmosphere.

8. A process as claimed in claim 7, wherein said protective atmosphere is nitrogen.

9. A process as claimed in claim 6, wherein the step of electrolessly depositing metal comprises sensitizing and activating said body and then placing said body in a solution means for producing a deposit of said metal from ions of said metal by the action of a means for reducing said ions, and wherein the body is heated for 4.5 to 6 minutes.

10. A process as claimed in claim 1, wherein the step of depositing silicic acid is carried out during the step of depositing metal.

11. A process as claimed in claim 1, wherein the step of depositing silicic acid is carried out after the step of depositing metal.

12. A process as claimed in claim 1, wherein the step of electrolessly depositing the metal film comprises sensitizing and activating said body and then placing said body in a solution means for producing a deposit of said metal from ions of said metal by the action of a means for reducing said ions, and wherein the body is heated at 500° to 600°C for 4.5 to 6 minutes.

13. A process for metallizing a glass or ceramic body comprising the steps of electrolessly depositing, as one material, a thin film of metal on said body, immersing the body in an aqueous solution of a water soluble compound of $SiO_2$, slowly removing the body from the solution for allowing retention of material from said solution, as another material, on the body, and heat treating the body at 500° – 600°C in a protective atmosphere for increasing the adherence of said materials to the body whereby the electrolessly deposited metal film is amenable to build-up by galvanic deposition of metal.

14. A process as claimed in claim 13, wherein the steps of immersing and removing are carried out before the step of depositing metal.

15. A process as claimed in claim 14, wherein the step of electrolessly depositing metal comprises sensitizing and activating said body and then placing said body in a solution means for producing a deposit of said metal from ions of said metal by the action of a means for reducing said ions, and wherein the body is heated for 4.5 to 6 minutes.

16. A process as claimed in claim 13, wherein the steps of immersing and removing are carried out during the step of depositing metal.

17. A process as claimed in claim 13, wherein the steps of immersing and removing are carried out after the step of depositing metal.

18. A process as claimed in claim 13, wherein the step of electrolessly depositing metal comprises sensitizing and activating said body and then placing said body in a solution means for producing a deposit of said metal from ions of said metal by the action of a means for reducing said ions, and wherein the body is heated for 4.5 to 6 minutes.

* * * * *

UNITED STATES PATENT OFFICE
CERTIFICATE OF CORRECTION

Patent No. 3,802,907    Dated April 9th, 1974

Inventor(s) Roland Apfelbach and Josef Jostan

It is certified that error appears in the above-identified patent and that said Letters Patent are hereby corrected as shown below:

In the heading of the patent, lines 2 and 3, change the inventors' names and addresses to
--Roland Apfelbach, Ay/Iller; Josef Jostan, Ulm-Böfingen, both of Germany--.
Column 5, after line 11, add heading
   --EXAMPLE V--.

Signed and sealed this 13th day of May 1975.

(SEAL)
Attest:

RUTH C. MASON
Attesting Officer

C. MARSHALL DANN
Commissioner of Patents
and Trademarks